Sept. 8, 1959
F. X. REES
2,903,574
IMPULSE TRACK CIRCUIT WITH FILTERED
ALTERNATING CURRENT SUPPLY
Filed Aug. 27, 1956
2 Sheets-Sheet 1
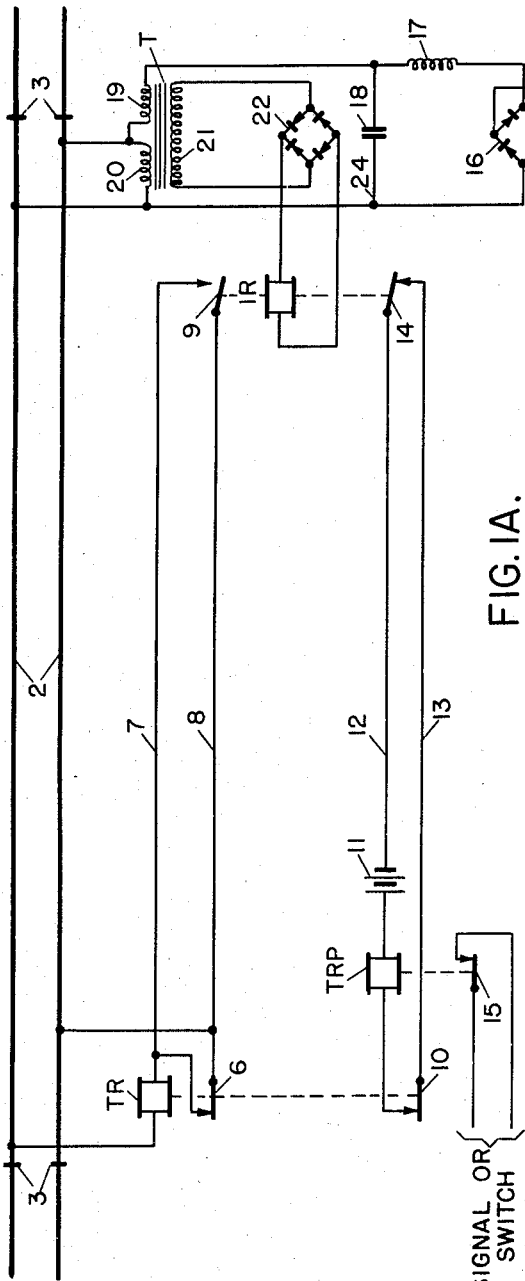
FIG. I.
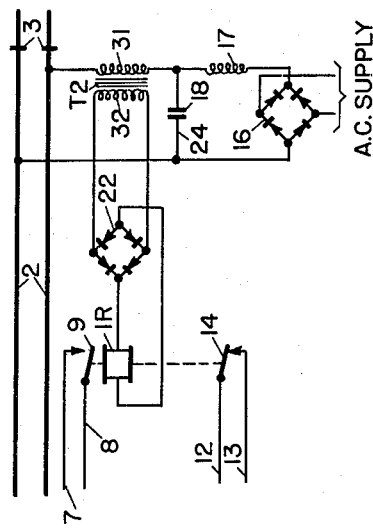
FIG. IA.
INVENTOR.
F.X. REES
BY *Forest B. Hitchcock*
HIS ATTORNEY

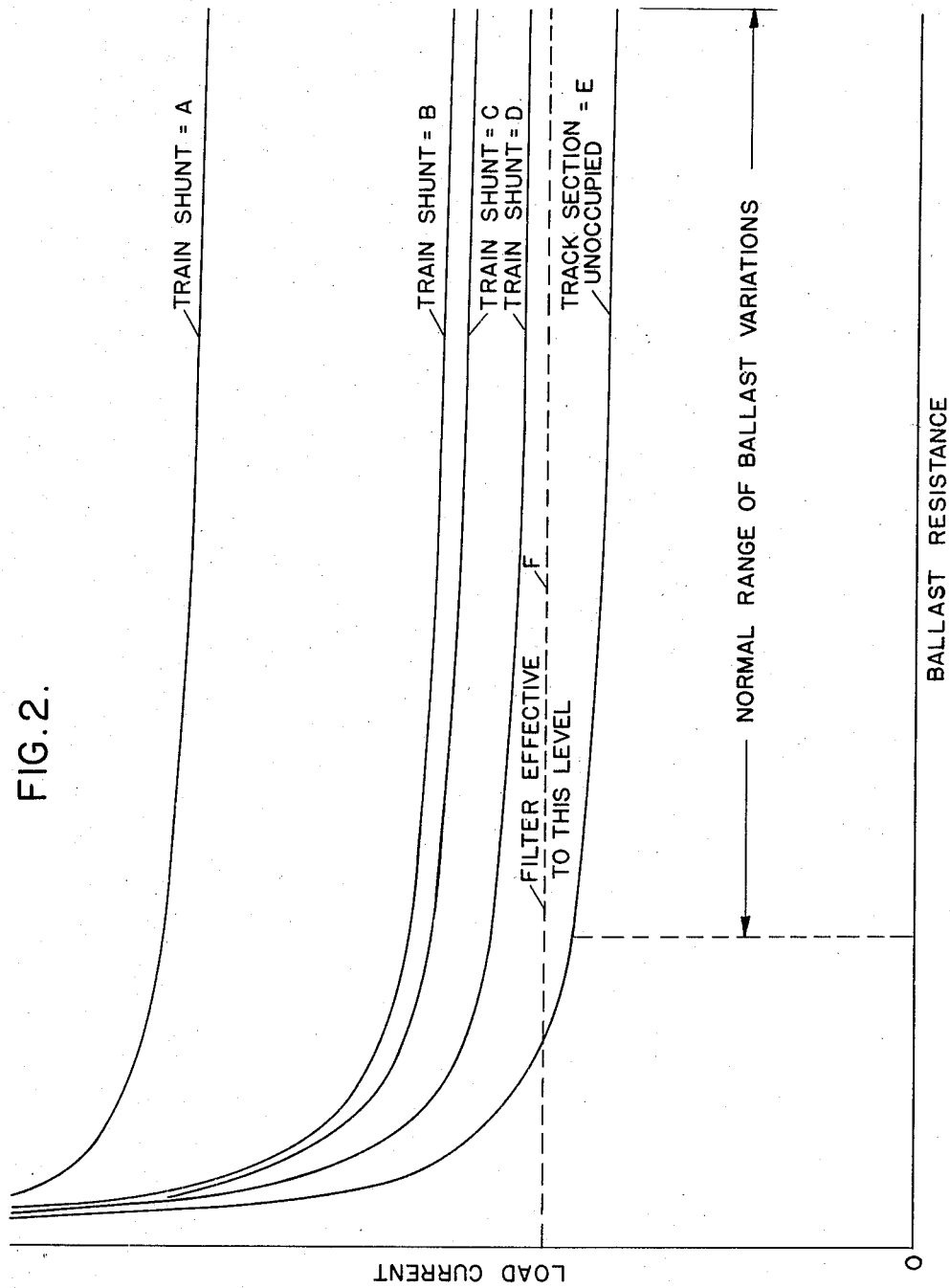

United States Patent Office 2,903,574
Patented Sept. 8, 1959

2,903,574

IMPULSE TRACK CIRCUIT WITH FILTERED ALTERNATING CURRENT SUPPLY

Frank X. Rees, Chili, N.Y., assignor to General Railway Signal Company, Rochester, N.Y.

Application August 27, 1956, Serial No. 606,367

7 Claims. (Cl. 246—34)

This invention relates to a track circuit organization for railroads, and more particularly to the control of track relay operation in such circuits utilizing rectified alternating current energy.

Since a track circuit organization utilizing rectified alternating current energy will permit the track circuit organization to retain substantially the same characteristics as a track circuit organization supplied by direct current energy with, however, certain distinct advantages over the latter which will be pointed out as the specification progresses, it is necessary to discuss the basic characteristics of a track circuit organization supplied with direct current energy in light of past performance to better distinguish the novelty of this invention.

In the usual direct current track circuit, a source of direct current energy is connected across the track rails at one end of a track section in series with a limiting resistor; and a track relay of suitable resistance is connected across the track rails at the other end of the track section. The values of relay and limiting resistances involved are selected in accordance with the range of variation in ballast conditions for the particular track section assuming a particular maximum permissible value of a train-shunt resistance. Normally, the track relay is energized; but, when a train enters the track section and shunts the rails, the current is reduced in the relay to a low value causing it to drop away.

While the usual direct current track circuit has been quite satisfactory in the past, the advance in recent years in railroad development, from the standpoint of speed and relatively light-weight train construction, as compared to the slower and heavier conventional type, has introduced a decided need for a more sensitive track circuit system. Such a system need be responsive not only to an effective train shunt which is sufficiently low in resistance so as to cause the release of the conventional track relay, but should also be responsive to a poor train shunt which does not provide a shunt sufficiently low in resistance to cause the release of such track relay. In my prior application Ser. No. 413,818, filed March 3, 1954, now U.S. Patent 2,817,010 granted Dec. 17, 1957. I disclosed a track circuit organization utilizing energy supplied from a direct current source, such circuit so arranged to be responsive to variations in interrail potential due to the passage of a train through the track section. While the arrangement disclosed in the aforementioned application has been found quite satisfactory, it has been found that such a track circuit organization may also be operated by using a rectified alternating current source of energy, which, in addition to providing the operational characteristics pointed out above, also provides additional advantages including increased sensitivity to train shunts.

Along with the problems arising out of the use of light-weight trains, poor track rail conditions continue to add to the difficulty of providing an effective train shunt. It is well known that thin film and coatings of relatively high resistance collect on the track rails. Such surface films are present to some extent on all track rails, but most frequently reach an objectionable thickness or condition on the rails of turnouts, crossovers, and other portions of the track not often used, with the result that such portions of track, where thick hard-to-puncture surface film conditions are present, are extremely difficult to shunt, particularly where low rail voltages such as are customary in track circuit practice, are employed.

The shunting sensitivity of the usual direct current track circuit varies over a wide range, due chiefly to variations in ballast leakage from rail to rail and the consequent changes in the energization of the track relay. That is, when the ballast is wet and the resulting leakage high, the track relay energy is low, and a train shunt of relatively high resistance is capable of releasing the track relay. However, under dry ballast conditions when the resulting leakage is low, the track relay energization may become abnormally high, so that difficulty may be experienced in obtaining safe shunting characteristics under various operating conditions. It has been found that ballast resistance may vary anywhere from approximately two ohms per thousand feet of track to an immeasurable amount over the same length of track and that such variations can occur within a short time interval due to a variance in the controlling elements such as a change in the atmospheric conditions.

Thus, it is a further object of the present invention to introduce into the usual track circuit a means for taking into consideration such variations in ballast resistance whereby the track circuit organization will be responsive to the entrance of a train upon the track section, such response being independent of the variation in ballast resistance, so long as the train provides some shunting effect. It should be noted that this shunting effect referred to here is not of itself required to be of such magnitude so as to short circuit the relay current sufficiently to cause the track relay to release; but, as will be pointed out later on, such shunting effect need only be of such proportion to cause the operation of the combination of elements herein disclosed.

More particularly, but without attempting to discuss the invention in detail at this time, a filtering arrangement has been provided in the system which is capable of smoothing out the sine loop characteristics of the pulsating unidirectional current which results from full wave rectification of the alternating current supply. Such filtering arrangement thus permits the track circuit organization to operate in the same manner as a track circuit originally energized with a direct current supply; but, at the same time, adds a control feature by taking advantage of its inherent ability to be an effective filter over only a limited range of load current to thereby supply control pulses when such limit is exceeded. Thus, a train providing some shunting effect, although insufficient to cause the track relay to release, will cause the load current to exceed the selected limit and permit the pulses of the unfiltered unidirectional current to be used for actuating relay means to indicate the presence of the train.

Other objects, purposes, and characteristic features of the present invention will be in part obvious from the accompanying drawings, and will in part be more specifically described hereinafter.

In describing the invention in detail, reference will be made to the accompanying drawings in which:

Fig. 1 is a diagrammatic view of a track section and associated apparatus to constitute one form of track circuit embodying the present invention, which form is more particularly applicable to short track circuit.

Fig. 1A is a diagrammatic view of a portion of a track section and associated apparatus to constitute a modification of the organization to which the present invention is applicable.

Fig. 2 is an analytic curve using a given set of track conditions which indicates a typical adjustment of a filtering arrangement effective for variations in the normal range of ballast resistance for a particular track section.

For the purpose of simplifying the illustration and facilitating in the explanation, various parts and circuits constituting the embodiment of the invention have been shown diagrammatically and certain conventional illustrations have been employed, the drawings having been made more with the purpose of making it easy to understand the principle and mode of operation, than with the idea of illustrating the specific construction and arrangement of parts that would be employed in practice. Thus, the various relays and their contacts and associated devices are illustrated in a conventional manner.

With reference to Fig. 1, a typical track section having rails 2 is shown as being separated from adjoining track sections by suitable insulated joints 3. It is assumed that this typical track section is a detector track section that may include a track switch and/or signal (not shown). The length of such a detector track section may vary within reasonable limits, and it is assumed that all of the apparatus including the track relay could be located in a single wayside case but having the opposite ends of the track section connected to it through suitable cable leads.

At the right-hand end of the track section a source of alternating current energy is connected across the track rails. Such alternating current is rectified by means of a full wave rectifier 16 so that the resultant energy supplied across the track rails is unidirectional. Connected in series with said source of rectified alternating current is an impulse transformer T having a primary winding 19, an auxiliary winding 20, and a secondary winding 21. The transformer T is suitably designed to have its auxiliary winding 20 connected directly across the track rails, with the polarity of such auxiliary winding 20 such that the flux produced by such winding is in opposition to the flux produced by the primary winding 19 for the purposes later explained. The secondary winding 21 is connected through a full wave rectifier 22 to the winding of an impulse relay IR which is a very sensitive relay and responds to very small values of current.

Also located at the right-hand end of the track section is an inductor 17 connected in series with the alternating current source and a capacitor 18 connected in multiple therewith. The combination of the inductor 17 and the capacitor 18 constitute the filtering apparatus which is used for the purpose of filtering the ripples or sine loop characteristics in the pulsating unidirectional current derived through the rectification of the alternating current supply. The relative proportion in which each element of the filter is effective to smooth out the pulsating current, so as to produce essentially a direct current through the organization, is dependent upon the magnitude of the current required by the track circuit for any particular ballast resistance condition. It should be noted that the primary winding 19 must be placed in such a position in the track circuit so as to be between the rails and the capacitor 18 to serve as a lightning protection to that portion of the track circuit organization at which the source of alternating current is located.

At the other end of the track section, the track relay TR is connected across the track rails through its own front contact 6 to constitute a stick circuit. In multiple with the contact 6, two wires 7 and 8 extend to the other end of the track circuit so that they can be connected through front contact 9 of the impulse relay IR, when this relay is picked up, to complete a pick-up circuit for the track relay TR. Also, associated with the track relay TR is a repeater relay TRP which is controlled through front contact 10 of the track relay TR, battery 11, wires 12 and 13, and back contact 14 of the impulse relay IR.

Thus, the response of the relay IR can be checked by contact 9 in the pick-up circuit of relay TR under those conditions where relay TR is released. The function of a check circuit of this kind was clearly disclosed in my prior application to which I have hereinbefore referred, and no claim is made herein with respect to the structure or the operation of such check circuit. Attention is also called to the fact that the invention disclosed in the present application may be used with or without such a check circuit at the user's option.

Since the relative conditions of the track relay TR and the impulse relay IR are combined in a track repeater relay TRP the contacts of this track repeater relay TRP such as contact 15 may be used for governing any control of the switch and/or signals which may be associated with this track section. In this connection, it should be recognized that this track section may include one or more track switches, and there may be electric switch locks, power operating switch machines, and the like, which are associated with these track switches and which, in accordance with the usual practice in railway signaling, would be governed by a track relay to prevent improper operation while the track section is occupied. Likewise, the signal may be provided for governing traffic over the track section; and it is usual practice to select signals through contacts of the track relays for the sections over which they govern. It is to be understood that all such control is assumed to be provided with the usual practice which has been indicated as being effected by contact 15 of the track repeater relay TRP. The details of such feature have not been shown because they are well understood in the art and may be assumed to be conventional.

Fig. 2 is an analytic curve showing a typical analysis of a track cricuit for any particular track section using assumed values of current and resistance and considering the normal range of variations in ballast resistance to extend between the limits shown. The analysis was prepared by comparing the relationship of the current supplied through the filter and the variation in ballast resistance for various ranges of train shunt characteristics.

More particularly, using a number of assumed values of various train shunts A, B, C, D and E, and computing the relative effect of each train shunt value over a range of variations in leakage resistance of the ballast of a particular section of track for given values of load current, a load current value can be determined below which the filter must be effective. Assuming that the train shunt is of infinite resistance and determining the effect of the variations in ballast resistance on the load current which is in effect, considering the track section as being unoccupied for shunting purposes, hte lowest value for which the filter must be proportioned to be effective can be ascertained. This is illustrated by the curve E. Also designated on the curve is the normal range of ballast variations, so that it is apparent that the filter should remain effective over this range with some additional margin. Taking this into consideration, the dotted line F has been drawn indicating the limit of the full effectiveness of the filter and the point beyond which the filter allows unfiltered unidirectional pulses.

Heretofore, the usual railway signaling practice with respect to direct current track circuits was to rely upon the low resistance value of the train wheels and axles for shunting the track relay. To insure this relay shunting, the American Railway Association standards require that for any track circuit, a resistance of 0.06 ohm anywhere in the circuit must be capable of shunting the track relay. However, as explained before, conditions of the rails along the given track section coupled with the light weight trains in use today very often prevent sufficient contact between the wheels and rails so as to produce adequate shunting to operate the switch and/or signal system in response to the functioning of the track relay. Add to this the variation in ballast resistance during a change of atmospheric conditions and it will be noted that the track circuit without further modification will not respond to the entrance onto the track section of a train providing a poor shunt.

For the purposes of the present discussion, a poor train shunt is assumed to be any value of train shunt resistance higher than the above mentioned standard train shunt resistance of 0.06 ohm. Also, it should be noted that no curve has been shown in Fig. 2 corresponding to a standard train shunt; but, curve D, for example, has been produced by considering a train shunt resistance of fifteen ohms which is 250 times poorer than the standard train shunt, i.e. 250 times higher in ohms.

However, by utilizing the characteristics of a pulsating current even though such current is unidirectional, the track circuit can be rendered responsive to even a poor train shunt. This invention accomplishes such by the use of a filtering ararngement in the form of an inductor 17 and a capacitor 18 inserted into the circuit arrangement.

The primary function of the filter is to smooth out the sine loop characteristics of the pulsating current as explained before. Such filter has been constructed so as to be fully effective only up to a predetermined value of current. Therefore, when the magnitude of the current through the filter increases beyond that predetermined value, the filter becomes increasingly ineffective thereby permitting the ripples in the pulsating current to flow through the primary windings 19 and 20 of the transformer T and thus induce alternating current in the secondary winding 21 to be used to actuate relay IR as later described.

Up to the time that the current through the filter is increased beyond its capacity, such current being properly filtered produces a stable magnetic flux in the primary coils 19 and 20 of the transformer T. Such stable magnetic flux does not induce current in the secondary winding 21 of the transformer T to energize the impulse responsive relay IR.

When a train enters the track section, even though an extremely poor shunt of itself, it will usually provide some shunting effect. This shunting effect will increase the current through the filter and with the capacity of the filter selected so as to become ineffective at a suitable load current value, the ripples in the pulsating unidirectional current will no longer be smoothed out. Further, as the resistance of the train shunt becomes increasingly lower, the current supplied to the track rails becomes increasingly larger. It is assumed for this discussion that ballast resistance remains stable during the period of time in which the train is occupying the track section. For any particular track section, it may be considered that the normal range of variations in ballast resistance will approach certain limits, as for example, those limits shown in Fig. 2. Hence, the filter has been constructed to be effective for the minimum value of ballast resistance occurring in a particular track section plus an added value to provide a safety factor for any abnormal condition arising in excess of the minimum ballast resistance normally experienced.

Since the flux of the primary winding 20 predominates over the flux of the primary winding 19 when the track section is unoccupied, any train shunt having an effective shunting value to cause sufficient additional current through the primary winding 19 to make its flux to predominate will be effective to cause a reversal in the net flux in the transformer. This reversal of the net flux causes the magnetic flux to pass through zero; and it follows that such reversal causes a very high rate of change of flux in accordance with the principles of impulse transformers to induce an initial impulse of substantial value in the secondary winding 21. Such initial impulse is supplied through rectifier 22 to the impulse relay IR and causes its immediate actuation to open back contact 14 and release relay TRP.

Assuming that the value of load current at which the net flux in the transformer becomes zero, is substantially equal to the value at which the filter organization begins to be ineffective as a filter and allow unidirectional pulses to be present in the transformer, it is evident that any train shunt causing reversal of the net flux will also be sufficient to cause the filter capacity to be exceeded and produce pulsating current in the primary windings. Since such train shunt (such as curves B, C and D of Fig. 2) is assumed to be sufficient to cause the winding 19 to predominate, these pulses produce a net pulsating flux in the core of the transformer T to induce an alternating current in the winding 21 which is rectified by the bridge rectifier 22 to result in the continued energization of the impulse relay IR. It is to be understood that the point of reversal of the net flux in the transformer may be varied in accordance with any selected filter capacity by altering the ratio of turns in coils 19 and 20 along with their respective resistance values.

When the train leaves the track section, the load current will drop to the normal value such as illustrated by the curve E in Fig. 2. This restores the predominance of the flux produced by the winding 20 and this restoration of the normal condition, of course, causes the flux to pass through zero to induce a final impulse in the winding 21 as the train leaves the track section. This final pulse is applied through rectifier 22 to the impulse relay IR maintaining it energized for a sufficient time following the leaving of the train to allow the application of the normal interrail potental to pick up the track relay TR through front contact 9 if the track relay TR has been released by the train shunt as later discussed.

Having thus described the various shunt characteristics arising out of a number of variable conditions, it is readily apparent that this invention provides circuit means which is sensitive to exceedingly poor train shunts which may enter the track section. Further, if such train stops within the track section, the circuit means is still sensitized as long as such a train provides some shunt, even though such shunt of itself is not sufficient to release the track relay. For example, the filter is so adjusted that under minimum ballast resistance conditions, the current supplied to the track is of normal value, then when the ballast resistance is increased, a decreasingly smaller current will flow to the track rails, but any shunt across the track rails of a lower resistance than the minimum ballast resistance with a suitable margin as above mentioned will cause the limit of the filter to be exceeded, so that pulses will be supplied to the transformer T even though the train is standing still in the section. These pulses will result in alternating current being induced in the secondary winding 21, which alternating current will be rectified by the rectifier 22 causing the actuation of the impulse relay IR. In the form of circuit organization shown in Fig. 1, the transformer T has differentially connected primary windings 19 and 20 so that this supply of pulses under the conditions just described is in addition to the initial and final impulses caused by the reversal of flux when a train enters and leaves respectively. In this connection, Fig. 1A shows the impulse transformer T2 as having a single primary winding in which instance any train shunt causing a load current exceeding the effective filter capacity will cause adequate current to be induced in the secondary winding 32 to effect the operation of the impulse relay IR, but the initial and final impulses of the main form are not present in this form of Fig. 1A.

Turning now to the operation of the complete track circuit organization disclosed in this application with reference to Fig. 1 of the drawings, and considering first the operation of the track circuit when the track section is unoccupied, a steady flow of unidirectional energy is present throughout the track circuit including relay TR and its front contact 6. During this normal current flow, no induction occurs in the secondary winding 21; hence, the impulse relay IR remains in its deenergized position. With the impulse relay IR deenergized and the track relay TR energized, front contact 10 of the track relay and the back contact 14 of the impulse relay IR are closed to complete the circuit including wires 12 and 13 for the track repeater relay TRP whose front contact 15 completes the switch and/or signal circuit. The track circuit is completed through its front contact 6 of the track relay back to the source of supply. The pick-up circuit comprising line wires 7 and 8 is maintained open during this condition by means of the front contact 9 of the impulse relay IR.

When a train enters the track section and shunts the track rails with the usual or regular shunting effect, the current is slightly reduced in the auxiliary winding 20 and the current is substantially increased in the primary winding 19. This increase in current in the primary winding 19 is due to the fact that the net resistance between the rails is decreased causing an increased current to flow. Such increased current exceeds the filter capacity since, as explained before, the filter is proportioned to be effective only for a range of current values over a range of normal variations in ballast resistance when no train is present. When this condition occurs, and the resulting flux in the primary windings passes through a zero value in the manner above described, a current is induced in the secondary winding 21. Such an induced current is rectified by means of a second rectifier 22 and the resultant energy causes the impulse relay IR to pick up opening its back contact 14 to release the track repeater relay TRP. In this way, the relay TRP may be released before the track relay TR has become released even though the train shunt is of a proper value to cause its release. This is because the inductive effect in the transformer and the response of the sensitive relay IR is very fast. For the purpose of this discussion, it is assumed that the entrance of a train into the track section 2 will be at some time in its progress through the section effective to release the track relay TR even though it may not be effective throughout all points in the track section due to sanding conditions or the like. But, it is additionally assumed that even though the train shunt may vary in its actual resistance from some value within the normal or standard range to some value making it a very poor train shunt, it is still considered that there will be some reasonable shunting effect that will cause the load current supplied through the filter to exceed its normal load capacity and supply pulses to the transformer T as above explained.

Thus, it is readily apparent that even if the train shunt is insufficient to maintain the track relay TR released, it will be adequate to cause the impulse relay IR to be energized in the above manner, interrupting the circuit for the track repeater relay TRP, opening front contact 15 of the relay TRP, thereby properly controlling the signal and/or switch control circuit. As long as this train shunt is present within the track section, regardless of whether the train is moving or standing still, the pulses of the unidirectional current will continue to induce a current into the secondary winding 21 of the transformer T, maintaining the impulse relay IR in the energized position.

On the other hand, it may be that a train will enter the section which is not capable of shunting the rails to a sufficient extent to cause the release of the track relay TR, but even under such conditions, the impulse relay IR may be operated and open back contact 14 to cause the release of the relay TRP so that the operation of the switch and/or signal circuit may be controlled completely independent of the operation of the track relay TR. This feature provides proper switch and/or switch signal control even when a train providing a shunt too poor to affect the track relay, passes through the track section or comes to rest within a section resulting in a very small change in interrail potential.

In the event the train shunt is sufficient to cause the track relay to drop away, the disclosure shown in Fig. 1 provides a pick-up circuit for reenergizing the track relay TR upon the exit of a train from the track section. Hence, with the relay IR picked up, front contact 9 of the relay IR completes the pick-up circuit over the wires 7 and 8 for energizing the track relay over the rails 2 in the regular way. With the impulse relay remaining in its energized position throughout the entire time that the train is present within the section, this pick-up circuit for the track relay is continuously closed. If the train shunt is sufficient to drop the track relay, the track relay will be picked up only upon the exit of the train from the section because the relay IR will remain picked up momentarily following the exit of the train since the rectifier 22 renders this relay IR slightly slow to release. If, however, the train shunt is not sufficient to drop the track relay then the track relay will remain energized and the continuous current will flow through the pick-up circuit, but the control circuit for relay TRP will nevertheless remain interrupted until the track section becomes unoccupied due to the operation of the contact 14. This stick circuit including front contact 6 of track relay TR and pick-up circuit including front contact 9 of relay IR provides a check on the response of the impulse relay IR, since some trains will cause the release of the track relay TR and in such instances the track relay TR would not again pick up unless the relay IR properly responded. This would cause a self-betraying failure by reason of holding the signals at stop through open front contact 15 of relay TRP as a result of front contact 10 remaining open. In this way, adequate check is provided for the control of relay IR so that it alone may under some circumstances properly control the switch and signal circuits even though the track relay under such circumstances does not respond.

Fig. 1A in the drawings indicates one modification of the invention herein disclosed, for the purpose of pointing out that such a filtering arrangement may be used with an impulse transformer having a single primary winding instead of a differential winding as shown in Fig. 1.

In Fig. 1A, the primary winding 31 is shown as being in series with the connection to the track rails 2 the same as winding 19 in Fig. 1. For this reason, it will be appreciated that the resistance of the primary winding 31, the same as the resistance of the primary winding 19, will be relatively low and in the order of the usual resistance of the limiting resistors used in track circuits. Such resistance of these primary windings in either form protects the source of energy against too heavy a load when a real good train shunt is applied to the rails and also causes a sufficient potential drop as to reduce the interrail potential effecting the release of the associated track relay.

Having described the track circuit organization responsive to variations in current flow due to the presence of a train shunt it is desired to be understood that the forms shown herein are selected to facilitate in the disclosure of the invention rather than to limit the number of forms which it may assume; and it is further understood that various modifications, adaptations, and alterations may be applied to the specific form shown to meet the requirements of practice without in any manner departing from the spirit or scope of the present invention.

What I claim is:

1. In combination, an insulated section of railroad track, a source of pulsating unidirectional current, circuit means for coupling said source across the rails of said track section, said circuit means including further means for eliminating pulsations from the current applied to said track rails when said track rails are unoccupied and the current requirements for said track are at normal low values, said means being inoperative to eliminate said pulsations when said track rails are occupied and the current requirements for the track are at values substantially higher than said normal values, and control means electrically coupled to said circuit means for responding to abrupt changes in current and to recurring pulsations in the current applied to said rails for providing a distinctive indication of the presence of a train in said track section.

2. The combination of claim 1 wherein said further means comprises an electrical filter.

3. The combination of claim 2 wherein said filter includes capacitive reactance.

4. In combination with an insulated section of railroad track, a source of pulsating uni-directional current, filter circuit means, circuit means for connecting said source of pulsating current and said filter in series with the rails at one end of said track section for supplying direct current thereto, said filter circuit means being constructed and arranged to provide effective filtering action on said pulsating current to supply essentially direct current to said rails for normal current values but failing to provide an effective filtering action on said pulsating current when said track section is occupied and requires above normal current values, control means electrically coupled to said circuit means being responsive to abrupt changes in current and to recurring pulses in the current supplied to said rails through said circuit means when said filter circuit means fails to provide effective filtering action.

5. The combination of claim 4 wherein said control means is inductively coupled to said circuit means by a transformer.

6. The combination of claim 4 wherein said control means comprises a sensitive relay electrically coupled to said circuit means through a rectifier and a transformer.

7. The combination of claim 4 wherein said filter comprises series inductive reactance and shunt capacitive reactance.

References Cited in the file of this patent
UNITED STATES PATENTS

| | | |
|---|---|---|
| 1,756,589 | Gilson | Apr. 29, 1930 |
| 2,053,897 | Crago | Sept. 8, 1936 |
| 2,091,708 | Gilson | Aug. 31, 1937 |
| 2,125,240 | Hitchcock | July 26, 1938 |